April 5, 1932. G. C. EASTER 1,852,203
NUT
Filed July 26, 1928 2 Sheets-Sheet 1

INVENTOR
George C. Easter.
BY William W. Varney
ATTORNEY

April 5, 1932.          G. C. EASTER          1,852,203
NUT
Filed July 26, 1928     2 Sheets-Sheet 2

INVENTOR
George C. Easter
BY William W. Varney
ATTORNEY

Patented Apr. 5, 1932

1,852,203

UNITED STATES PATENT OFFICE

GEORGE C. EASTER, OF BALTIMORE, MARYLAND, ASSIGNOR, BY MESNE ASSIGNMENTS, TO THE VULCAN STEEL PRODUCTS COMPANY, OF BALTIMORE, MARYLAND, A CORPORATION OF MARYLAND

NUT

Application filed July 26, 1928. Serial No. 295,403.

This invention relates to an improved nut known as of the "grip nut" type, and has for its object a nut of simple and cheap construction, durable and positive in its action.

A further object of my invention is the providing a nut wherein as strains are applied to it in use the nut becomes more definitely locked in position.

With the foregoing and other objects in view, my invention consists of the novel construction, combination and arrangement of parts as hereinafter specifically described and illustrated in the accompanying drawings, wherein is shown the preferred embodiment of my invention, but it is understood that changes, variations and modifications may be resorted to which come within the scope of the claims hereunto appended.

I am aware that nuts have been formed by rolling and doubling back upon themselves and then afterwards opened apart. One difficulty of this type of nut is that as the load is applied there is a tendency to bring the nut into the position it was when threaded, thus making it easier to become disengaged, a defect which I have overcome in my nut.

A further defect in nuts of this type is the control of the flexibility thereof for locking purposes. I have overcome these difficulties as hereinafter set forth.

Figure 1:
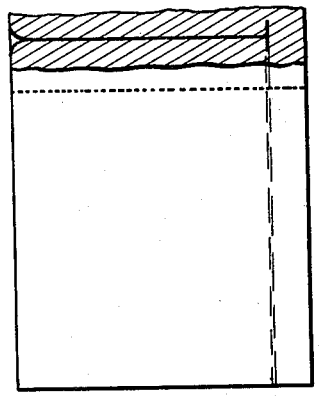
Figure 2:
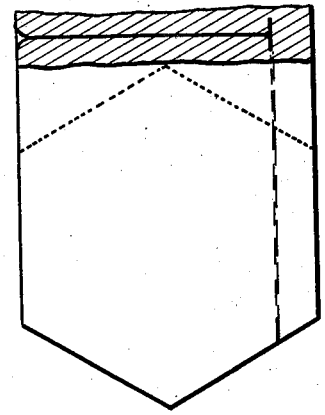
Figure 3:
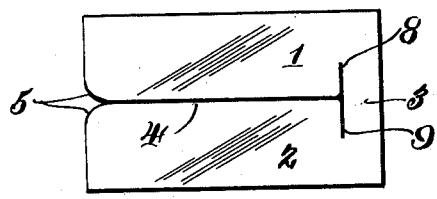
Figure 4:
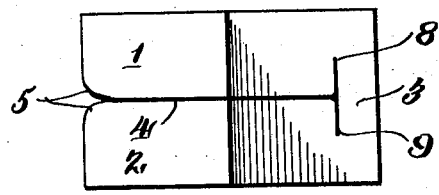
Figure 5:
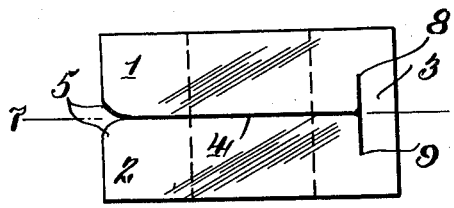
Figure 6:
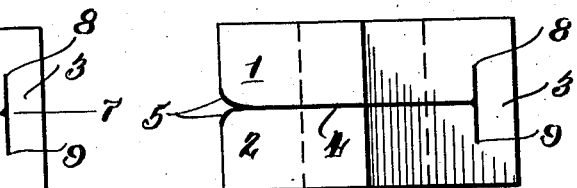
Figure 7:
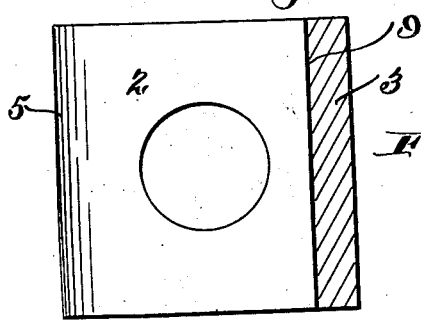
Figures 8, 9:
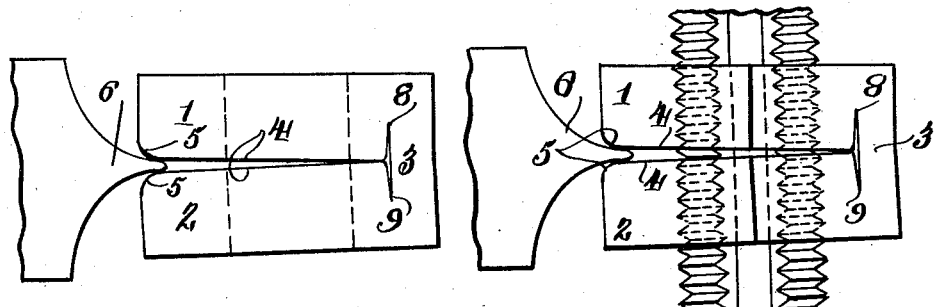
Figure 10:
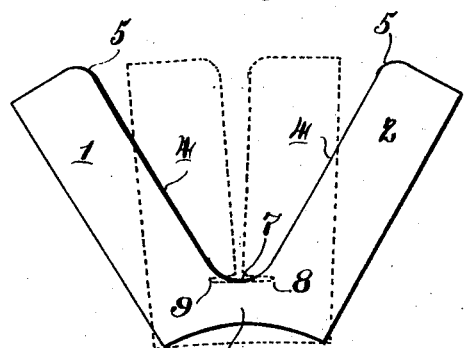
Figure 11:
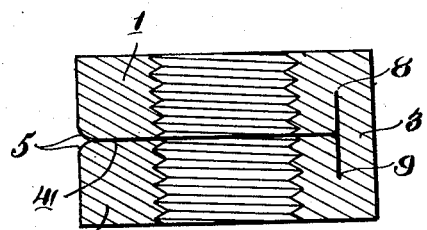
Figures 12, 13:
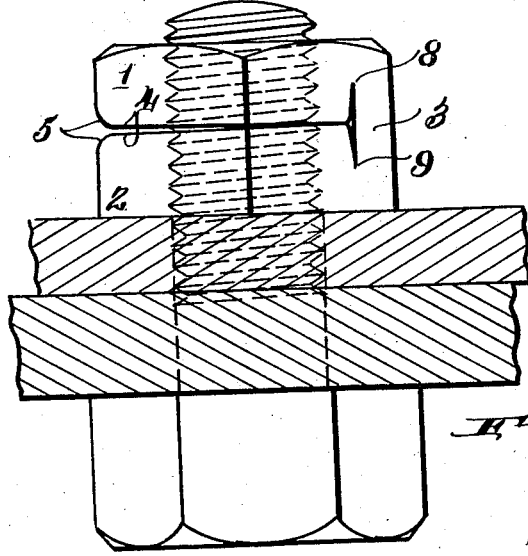

In the drawings of the herein described embodiment of my invention, I have shown a series of square and a series of hexagonal nuts, Figs. 1 and 2 being a plan view of the bar from which the same are formed, an end view of the bar being shown in Figs. 3 and 4. Figs. 5 and 6 show a view in elevation of the blank nut after having been cut off and punched, which may be done either hot or cold. Fig. 7 is a view taken through 7—7 of Fig. 5, showing one of the nut parts 2 and the yoke 3, in section. Fig. 8 shows a blank nut with a spreading tool inserted preparatory to tapping, Fig. 9 being the same blank nut in process of tapping. Fig. 10 shows a cross section of the stock from which the nut is formed. Fig. 12 shows the nut on a bolt being set up, the threads of the bolt spreading the nut against its initial spring to permit its being placed in position. Fig. 11 is a sectional view of nuts 1 and 2 finished and ready for use, Fig. 13 being a view in elevation of the same nuts.

For information concerning this application, but which is not claimed herein as the same forms the subject matter of another application about to be filed, I will briefly outline the formation of the bar from which the nuts are stamped. This is, preferably, rolled stock which may be of substantially the cross-section shown in Fig. 10, the width of the throat being varied to determine the depth of the cold shots in the finished product after having been formed into the bars shown in Figs. 1 and 2.

In the drawings of the herein-described embodiment of my invention, 1 and 2 are parts or nuts, which are integrally formed with reference to each other by means of the yoke 3. 4 is the inside face of the nuts 1 and 2 and is provided with a chamfer 5 at their extending meeting to permit an entering tool 6 to enter for the purpose of prying apart nuts 1 and 2 for threading purposes.

Inside face 4, shown in Fig. 10, in the bar before being jammed together is provided with portion 7 joining the face on each of the nuts 1 and 2; this portion may be straight, or curved, and in dimensions suitable for forming the fold, or cold shots, 8 and 9. The greater this portion 7, the deeper will be the folds, consequently, the weaker the spring between the two nut portions 1 and 2; this regulates the spring, or tension, between nuts 1 and 2, as circumstances may require.

When the bar is finished and inside face 4 contacting upon itself the nuts are stamped, or pressed, and formed as is well known in the trade by standard means. In the threading, however, entering tool 6 is entered between inside face 4 to such a desired extent as to produce the required angle opening of said face 4 and the nuts 1 and 2. When the nut is thus distorted tapping takes place. I have described the above means for entering tool 6 prior to tapping; the bar may, however, have an initial opening as desired for tapping, and after tapping the said nuts 1 and 2 may be pressed together, the result in both cases, it appears, being substantially the same. I prefer the method first described, as the strains are somewhat different in the finished product, and the cost of manufacture is also somewhat less. This, however, is more fully described in another application mentioned above.

The drawings show folds, or cold shots, 8 and 9 as substantially right lines. This, however, is seldom, if ever, obtained in practice, as a ragged, or curved, line depending upon the temperature of rolling and the flow of the metal is obtained.

From the foregoing it will be apparent that a distinctive feature of the present invention resides in the provision of a finished nut consisting of a plurality of parts whose inner faces are normally in contact. This is a valuable feature in manufacture as it enables the finished nut blank to be stamped from a formed nut bar cheaply and by the ordinary processes. When the faces are in contact the threads of the tapped portions of each part or section are out of register; the same having been threaded as mentioned above by forcing apart the said parts and holding the same in such separated position when threading. Upon application of the nut to the bolt the latter will pass through the section initially applied and because of the usual tolerance between the threads of the bolt and the nut the bolt will enter the following section for a sufficient distance to take proper bearing so that upon continued application of the nut the sections will be forced apart and the metal in the yoke will be placed under strain thereby causing the parts or sections to be under tension and more tenaciously grip the bolt.

Having thus described my invention, what I claim and desire to secure by Letters Patent is:

1. A grip nut blank consisting of a plurality of parts integrally formed with a yielding means between the same, said parts at the limit of their adjacent faces being chamfered to form a guiding means for an entering tool when the nut blank is machine carried.

2. A grip nut blank formed of a plurality of parts with a yielding means between the same the edge of one of said parts being chamfered to form a guiding means for an entering tool when the nut blank is machine carried.

GEORGE C. EASTER.